United States Patent
Leguay et al.

(10) Patent No.: US 9,369,923 B2
(45) Date of Patent: Jun. 14, 2016

(54) TRANSMISSION METHOD IN AN AD HOC MULTI-HOP IP NETWORK

(71) Applicant: THALES, Neuilly sur Seine (FR)

(72) Inventors: Jeremie Leguay, Gennevilliers (FR);
Helder Marques, Gennevilliers (FR);
Damien LaVaux, Gennevilliers (FR);
Hicham Khalife, Gennevilliers (FR);
Vania Conan, Gennevilliers (FR)

(73) Assignee: THALES, Neuilly sur Seine (FR)

( * ) Notice: Subject to any disclaimer, the term of this patent is extended or adjusted under 35 U.S.C. 154(b) by 151 days.

(21) Appl. No.: 14/019,254

(22) Filed: Sep. 5, 2013

(65) Prior Publication Data
US 2014/0071826 A1    Mar. 13, 2014

(30) Foreign Application Priority Data
Sep. 5, 2012   (FR) ...................................... 12 02372

(51) Int. Cl.
| | |
|---|---|
| *H04L 12/26* | (2006.01) |
| *H04W 28/12* | (2009.01) |
| *H04W 28/02* | (2009.01) |
| *H04L 12/801* | (2013.01) |
| *H04L 12/851* | (2013.01) |
| *H04W 84/18* | (2009.01) |
| *H04L 12/833* | (2013.01) |

(52) U.S. Cl.
CPC ............... *H04W 28/12* (2013.01); *H04L 47/17* (2013.01); *H04L 47/2433* (2013.01); *H04W 28/021* (2013.01); *H04L 47/2458* (2013.01); *H04W 84/18* (2013.01)

(58) Field of Classification Search
None
See application file for complete search history.

(56) References Cited

U.S. PATENT DOCUMENTS

| | | | |
|---|---|---|---|
| 7,450,512 B1 * | 11/2008 | Young et al. ................... | 370/235 |
| 7,995,476 B2 * | 8/2011 | Lou et al. ....................... | 370/232 |

(Continued)

FOREIGN PATENT DOCUMENTS

WO    WO 2009/071688    6/2009

OTHER PUBLICATIONS

Zhai et al., "Alleviating Intra-Flow and Inter-Flow Contentions for Reliable Service in Mobile Ad Hoc Networks," *MILCOM 2004, IEEE* Monterey, CA, 3: 1640-1646 (2004).

(Continued)

*Primary Examiner* — Otis L Thompson, Jr.
(74) *Attorney, Agent, or Firm* — Knobbe, Martens, Olson & Bear, LLP

(57) ABSTRACT

The transmission method according to the invention includes transmitting a message from a source transmitting node to a final receiving node through a series of hops from a transmitter node to an immediately following receiver node, using:
  a) a reliability management mechanism including applying a retransmission law of the message on the hop, from the transmitting node to the receiving node, said law including message non-retransmission rules leading to the non-retransmission of the message,
  b) a mechanism for managing congestion of the nodes providing for a limitation of the throughput ($\lambda$) for sending from a transmitting node to a receiving node following congestion information from the receiving node sent to the transmitting node, said mechanism being applied only hop-by-hop, the congestion information only being transmitted from a receiving node to a transmitting node over a same hop to limit the throughput of only the transmitting node toward only the receiving node.

10 Claims, 4 Drawing Sheets

(56) References Cited

U.S. PATENT DOCUMENTS

| | | | |
|---|---|---|---|
| 2002/0004842 A1* | 1/2002 | Ghose et al. | 709/235 |
| 2002/0027495 A1* | 3/2002 | Darby et al. | 340/298 |
| 2004/0167988 A1* | 8/2004 | Rune et al. | 709/238 |
| 2006/0215550 A1* | 9/2006 | Malhotra | 370/229 |
| 2007/0076610 A1* | 4/2007 | Yang et al. | 370/235 |
| 2008/0259798 A1* | 10/2008 | Loh et al. | 370/235 |
| 2009/0147685 A1* | 6/2009 | Malhotra | 370/236 |
| 2010/0031109 A1* | 2/2010 | Muramoto et al. | 714/748 |
| 2010/0226266 A1* | 9/2010 | Terrace et al. | 370/252 |
| 2011/0141888 A1 | 6/2011 | Leguay et al. | |
| 2012/0188934 A1* | 7/2012 | Liu et al. | 370/312 |
| 2013/0294244 A1* | 11/2013 | Fujita et al. | 370/235 |
| 2013/0343191 A1* | 12/2013 | Kim et al. | 370/235 |

OTHER PUBLICATIONS

Lien et al., "Hop-by-Hop TCP over MANET," *IEEE Asia-Pacific Services Comp. Conf.*, Piscataway, NJ, USA, 1150-1155 (2008).

Leguay et al., "Non Disruptive Data Services Towards Real-Time Traffic in Wireless Ad Hoc Networks," *Communications, IEEE Int'l. Conf.*, Piscataway, NJ, USA, 1-5 (2009).

Search Report issued in French Application No. 1202372 (2013).

* cited by examiner

| Offsets | Octet | 0 | | | | | | | | 1 | | | | | | | | 2 | | | | | | | | 3 | | | | | | | |
|---|---|---|---|---|---|---|---|---|---|---|---|---|---|---|---|---|---|---|---|---|---|---|---|---|---|---|---|---|---|---|---|---|
| Octet | Bit | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
| 0 | 0 | T P E | R Q T | \multicolumn{6}{l|}{Option Value} | \multicolumn{16}{l|}{SeqNb} |
| 4 | 32 | \multicolumn{8}{l|}{checksum} | \multicolumn{8}{l|}{OrigProto} | \multicolumn{8}{l|}{FlowID} | \multicolumn{8}{l|}{Reserved} |
| 8+ | 64+ | \multicolumn{32}{l|}{Data} |

FIG.3

TRANSMISSION METHOD IN AN AD HOC MULTI-HOP IP NETWORK

This application claims priority to French patent application no. 1202372, filed Sep. 5, 2012, the content of which is herein incorporated by reference in its entirety.

The present invention relates to a method for transmitting information in an ad hoc multi-hop network including the transmission of a message from a source transmitting node to a final receiving node through a series of hops from a transmitter node to an immediately following receiver node, using:

a) a reliability management mechanism including:
  upon the or each compliant receipt on each hop of at least one message by the receiving node, the sending of an acknowledgment message to the sole transmitting node,
  applying a retransmission law of the message on the hop, from the transmitting node to the receiving node, said law including message non-retransmission rules leading to the non-retransmission of the message,
b) a mechanism for managing congestion of the nodes providing for a limitation of the throughput for sending from a transmitting node to a receiving node following congestion information from the receiving node sent to the transmitting node.

Ad hoc multi-hop networks are in particular used in radio communication networks, and in particular military networks in which communication is generally only possible between nodes within radio range. A routing protocol then relays the messages or packets from node to node to allow end-to-end connectivity.

The nodes in the network may or may not be mobile.

These networks are ad hoc networks, in that the network does not include a predefined infrastructure. They are often referred to as MANET.

Due to the mobility of the nodes and the radio propagation problems, the connectivity varies considerably over time and space, complicating the transport of data, in particular due to the lack of reliability of the transmission on each of the radio hops between a transmitting node and a subsequent receiving node and any congestion of certain nodes having to transmit more messages than they are capable of transmitting.

In this context, the transport solutions developed for networks using an IP protocol (Internet Protocol), for example the TCP transport protocol, are not satisfactory for the following reasons.

The source node and the destination node coordinate to regulate the dispatch speed of the data and decide on retransmissions. Ad hoc networks, however, require that the throughput of flows be well controlled on each radio hop and that lost packets from the source node not be systematically retransmitted.

The transfer protocols developed for IP networks have been designed for networks with a low loss level, short timeframe and low jitter. These protocols therefore do not react suitably in ad hoc networks. For example, when a packet loss occurs, TCP reduces its throughput, thinking that congestion is involved, whereas that is not systematically necessary.

The current ad hoc radio communication networks offer a basic IP support. They are capable of routing packets between a source node and a destination node, but do not provide optimized end-to-end IP service in the ad hoc network. If the application uses the TCP transport protocol on that network, the flow control is done "at best", i.e., without support for the radio nodes, which poses performance problems, and in particular congestion of the intermediate nodes, and end-to-end retransmissions.

Solutions have been submitted to make it possible to preserve the IP Protocol on networks having specific characteristics. Examples include the following solutions, classified by layer according to the OSI model.

Layer 4. Performance Enhanced Proxies (PEP) (http://www.faqs.org/rfcs/rfc3135.html) or Split TCP make it possible to improve TCP performance when a connection crosses through a link having high error rates or low resources (low bandwidth, high timeframe). PEPs intercept the flows (e.g., TCP session) to optimize the data transport over a difficult network segment. Two PEPs situated on the edge of the segment (satellite, for example) may use a specific protocol between them. Many techniques are used in PEPs, for example such as local retransmission of lost TCP segments (H. Balakrishnan, S. Seshan, and R. Katz. Improving Reliable Transport and Handoff Performance in Cellular Wireless Networks. ACM Wireless Networks, Vol. 1, 1995). This mechanism makes it possible to recover the data quickly without affecting the throughput of the source. PEPs are generally used to optimize transport over one poor quality segment, not several. This solution has nevertheless been used in an ad hoc network (Split TCP for mobile ad hoc networks. Kopparty, S.; Krishnamurthy, S. V.; Faloutsos, M.; Tripathi, S. K.; GlobeCom 2002) by breaking the end-to-end connections down into several local segments. The proxies then store the packets and deliver them to the next proxy.

This solution is located at the transport level (layer 4) by intercepting the end-to-end TCP connections. It therefore does not work transparently with respect to the transport protocol. Furthermore, the hop-by-hop mechanism adjusts the output flow in proportion to the flow rate of the acknowledgments received. It does not allow a preventive reaction to congestion and may needlessly transmit messages while the following node is not capable of receiving them.

Layer 4. Many adaptations of TCP for ad hoc networks have been proposed, such as A-TCP (J. Liu, S. Singh. ATCP: TCP for Mobile Ad Hoc Networks. IEEE Journal on Selected Areas in Communications. 1999) or TCP-ELF (G. Holland and N. Vaidya, "Analysis of TCP performance over mobile ad hoc networks," Proc. ACM Mobicom'99, Seattle, Wash., 1999). These solutions add a module that monitors the status of the network (based on ECN and ICMP messages) and allows the source to differentiate between losses due to congestion and those related to transmission errors. These end-to-end approaches do not make it possible to perform hop-by-hop flow monitoring. Furthermore, layer 4 (and higher) approaches do not allow transparency with respect to the transport protocol used by the application (for example, TCP, UDP).

Layer 4. New hop-by-hop transfer protocols have been defined for ad hoc radio communication networks such as Hop (Block-switched Networks: A New Paradigm for Wireless Transport. Ming Li, Devesh Agrawal, Deepak Ganesan, and Arun Venkataramani in Proceedings of the 6th ACM/USENIX Symposium on Networked Systems Design and Implementation (NSDI 2009), Boston, Apr 2009. http://hop.cs.umass.edu/). This protocol defines flow monitoring on each hop and an end-to-end loop to ensure reliabilization. Applications must use a specific "hop" socket to be able to communicate with this protocol. This is not a transparent approach. A similar approach called "Hop-by-hop TCP" (Hop-by-Hop TCP over MANET. Yao-Nan Lien, Yi-Fan Yu. IEEE APSCC 2008) modifies TCP to break it into two mechanisms: an end-to-end part that primarily handles congestion monitoring, and a part on each hop that reliabilizes the radio hops. The method described in this document differs from Hop as follows.

Hop manages the complete reliabilization by block (of any size). The aim is to reliabilize the transmission of blocks hop-by-hop, then end-to-end, as Hop targets total reliability. The breaking into blocks is used to decrease the network overload related to the acknowledgments.

Hop operates in connected mode. The nodes must open and maintain connections on each hop coming closer and closer to the destination. A keep-alive mechanism is established to ensure that the blocks are still transmitting on the downstream nodes. If an acknowledgment from the final destination is not received within a certain amount of time, the intermediate nodes may retransmit the block.

Hop monitors the throughput of the blocks with a stop-and-wait solution. A block is not sent to the following node unless the previous block has been acknowledged.

Hop is a transport protocol; the application must therefore be modified to be able to use it.

Layer 3. Certain IP tunnel solutions use an underlying transport protocol (supplying a service providing reliability, orderly delivery and flow monitoring). This is the case for vTun, SSH and certain VPN tunnels, which are based on a TCP connection. This solution is used in a network such as the Internet, the TCP connection not being optimized to pass through a constrained network.

Layer 2. Solutions of the ARQ (Automatic Repeat ReQuest) type make it possible to make up losses on a hop by trying several successive transmissions at increasing time intervals. These solutions do not allow overall management of the throughput of the flow and create variations in the Round-Trip Time (RTT) that are detrimental to transfer protocols such as TCP.

The desired flow monitoring may be based on:

In summary, the state of the art can be broken down into 3 categories:

Solutions that propose a new transport protocol and that therefore require a change at the source and destination (Hop).

Solutions that break the end-to-end TCP flow monitoring (PEP, split TCP and other variations).

Adaptations of TCP that remain end-to-end and require transmission from the source even if the loss is located very close to the destination.

It must be understood that the solutions developed thus far do not make it possible to benefit from the IP service on an ad hoc multi-hop network and in particular a radio communication network, by offering a transparent IP service with optimized transport of the flow of packets irrespective of the transport protocol used (TCP, UDP, SCTP, etc.) and making it possible in particular to operate with an IP-Sec encrypted environment.

The invention aims to provide a solution to this problem.

To that end, the invention relates to an information transfer protocol of the aforementioned type, characterized in that the congestion management mechanism is applied only hop-by-hop, the congestion information only being transmitted from a receiving node to a transmitting node over a same hop to limit the throughput of only the transmitting node toward only the receiving node.

According to specific embodiments, the method includes one or more of the following features:

the retransmission law for a given transmitting node accounts, for the non-retransmission rules, for variables related to the nodes of the preceding hops between the source transmitting node and the transmitting node;

the retransmission law for a given transmitting node accounts, for the non-retransmission rules, for the number of nodes already traveled by successive hops from the source transmitting node;

said method includes a step for marking the type of information contained in the message and the retransmission law accounts, for the non-retransmission rules, for the type of information contained in the message;

an acknowledgment message is sent only upon compliant receipt of a set of several messages;

the congestion management mechanism uses an additive increase multiple decrease (AIMD) law to calculate the throughput of the transmitted node;

the congestion management module uses a definitive non-transmission of certain messages from the transmitting node to the receiving node in case of congestion of the receiving node;

the non-transmission of messages is applied to messages having traveled through the fewest hops to the transmitting node and/or messages having the lowest probability of reaching the final receiving node;

the information contained in the transmitted messages is information formatted for transmission on a network according to the IP Protocol and the transmitted messages include, in addition to information in the IP formats, a header (HBH) capable of providing the reliability management and congestion management mechanisms; and the header includes information representative of the transport protocol.

The invention will be better understood upon reading the following description, provided solely as an example and done in reference to the drawings, in which:

FIG. 3 is a diagrammatic view of the header of the message used in the protocol according to the invention.

FIG. 1 shows an ad hoc network 10, or MANET, whereof the nodes 12, shown by circles, are for example formed by mobile radios carried by military vehicles.

The network 10 allows communication between nodes by successive hops from node to node, but also allows communication to and from nodes outside the network, such as the nodes 14 and 16.

Figure 1:
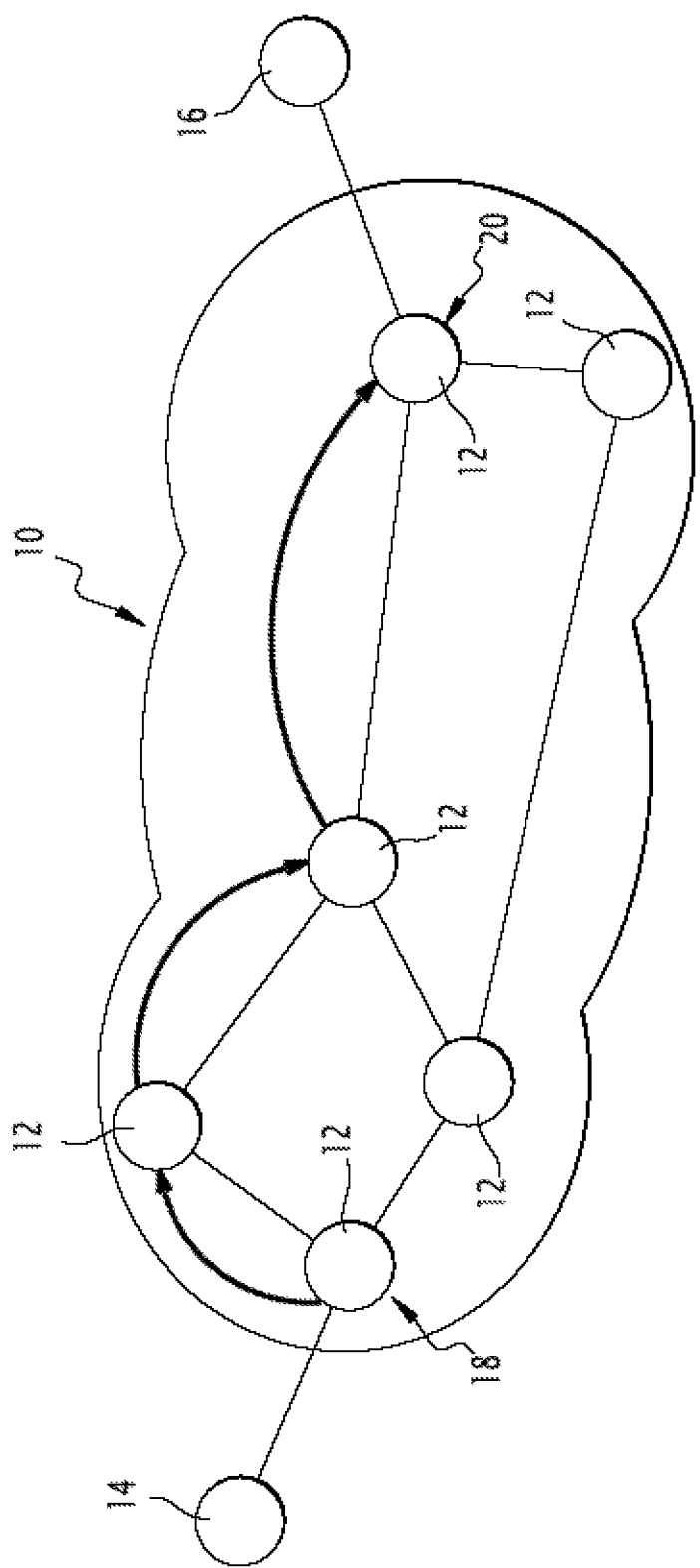
FIG. 1 is a diagrammatic view of a network in which the method according to the invention is implemented.

Thus, the nodes of the network 10, related to the nodes outside the network 10 such as the nodes 14 and 16, perform a gateway function. This is the case for the nodes 18 and 20 in FIG. 1. The other nodes 12 of the network 10 perform only the transmission and reception of information to and from other nodes of the network. They then only constitute relay nodes.

A gateway node 18, 20 for example hosts a local application or is connected to another IP network, for example a LAN or WAN network that then each form an outside node such as the nodes 14 and 16.

As is known in itself, the ad hoc network 10 sends messages from the IP address of the receiving node by successive hops in the network 12. Thus, a message sent by the originating node 14 to the receiving node 16 first passes through the gateway node 18, then through two relay nodes 12 of the network before reaching the gateway node 20 and finally being transmitted to the receiving node 16.

The method according to the invention separates the handling of reliabilization and that of congestion with different parameters:

It handles the reliabilization on each hop with a message window W and a reliabilization effort parameter p. The window W makes it possible to reduce the overload related to acknowledgments and manages the simultaneous dispatch of transmissions or retransmissions. The data may be lost after a certain reliabilization effort p that may for example be a time or a maximum number of retransmissions. Thus, the effort ρ defines a non-retransmission rule for packets since, when the retransmission effort is above a predefined maximum effort, the retransmission does not take place.

It handles congestion with a hop-by-hop back pressure mechanism that regulates the maximum output flow λ from a node based on the congestion of the following node.

Implementation in an IP Context

This method is implemented in an ad hoc radio as an optimized IP packet transport service. In that case, no adaptation of the application is necessary. The protocol regulates the data throughput to avoid congestion of the network. It provides hop-by-hop reliabilization that is adjustable based on the protocol and the additional applications used.

The need for configurable, not total, reliability is due to the fact that most of the network or application protocols in addition to IP also use acknowledgment mechanisms. Trying to achieve total reliability at the IP level could worsen congestion and interfere considerably with the additional protocols. Contrariwise, providing a non-reliabilized service is not effective in a radio environment as described above. A compromise must therefore be found.

Figure 2:
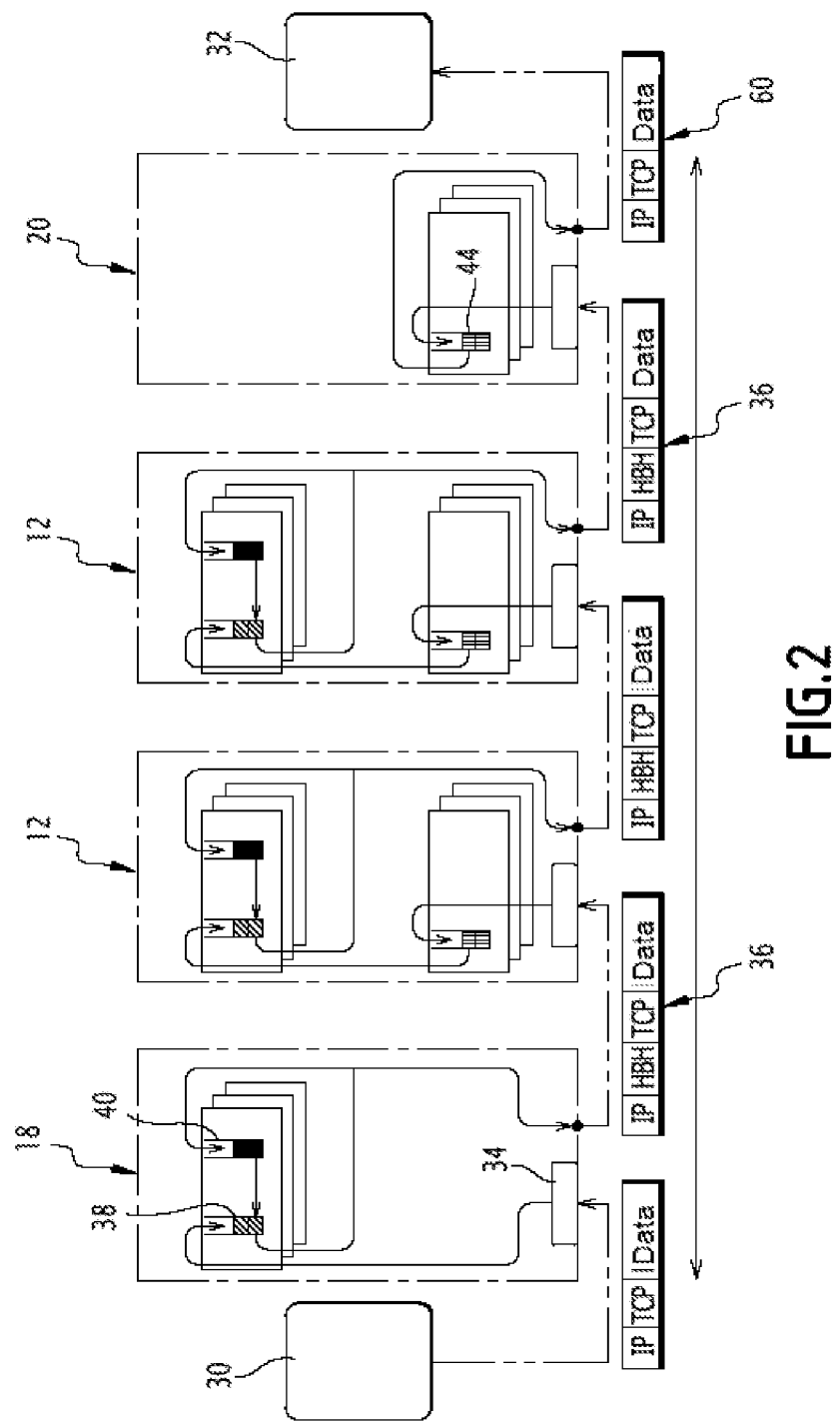
FIG. 2 is a diagrammatic view illustrating the flow of information from node to node in the network.

FIG. 2 shows the operations carried out on the IP packets in more detail. The IP packets are intercepted on the first gateway node 18 to be handled by the method. They are restored as such on the last gateway node 20. In the context of its implementation for IP, the method offers an additional layer of reliabilization and congestion monitoring without being at the transport level within the meaning of the OSI (level 4). It is defined as level 3.5 according to the OSI model, as it involves a header called HBH (hop-by-hop) between the IP header and the transport header (TCP or UDP, for example). The method may be implemented at different levels of the OSI model but, to simplify the presentation, in the considered example, the implementation is done at level 3.5.

The nodes are capable of sending messages toward other nodes based on the IP address of the receiving node and the routing rules specific to the IP network. Each time one or more messages are received, and advantageously after the receipt of the set of messages on the window W, the receiving node returns, as is known in itself, an acknowledgment message to the transmitted node.

FIG. 2 also illustrates the processes and queues necessary for the operation of the method. We will outline their use in the rest of the document.

FIG. 2 shows the gateway nodes 18, 20 as well as the intermediate nodes 12 of the ad hoc network. The node 18 receives information from an IP application denoted 30 or a node of an IP network denoted 32.

The message received from the application 30 has a format known in itself, with the receiving IP address, followed by the indication of the transport protocol used, for example TCP, followed by the payload, i.e., the data specific to the message.

At the input of the node 18 acting as the gateway node, during a step denoted 34, the message is modified to add the HBH header, between the IP header and that of the transport protocol used to form the frame as designated by reference 36 in FIG. 2.

The detail of the added header is illustrated in FIG. 3.

The information in the header of the protocol is as follows:

TPE: represents the TyPE of a packet, i.e., data or acknowledgment (DATA or ACK).

RQT: this flag indicates a special ReQuesT. An explicit request for acknowledgment for a DATA package, or the indication of congestion for an ACK.

OptionValue: represents the size of the SACK option for the ACK packets. For data packets DATA, it may be used to indicate to the receiver to empty the ooList queue (in case of definitive loss of the packet by the transmitter, for example) and to add FEC information, for example.

SeqNb: contains the sequence number for DATA packets and the sequence number for the acknowledged packet for ACK packets.

FlowID: contains the unique value that identifies the flow. This value is calculated upon each hop when a new flow is recorded.

Checksum: contains the checksum for the packet.

OrigProto: Indicates the number of the transport protocol (TCP or UDP, for example).

The IP message thus completed is placed in an output queue 38 hereafter referred to as outputQ.

Based on the output flow λ, specific to the node 18, the messages present in the queue are transferred to the following node 12. The routing toward the node 18 is done as is known in itself from the IP address present in the message 36.

Simultaneously, the message transmitted to the node 12 is also transmitted within the node 18 toward another queue 40 hereafter referred to as nACKedQ. This queue includes messages for which acknowledgment has not been received and which have not yet been destroyed.

The unacknowledged messages 26 that must be retransmitted are sent from the queue 40 to the queue 38 based on predetermined rules to allow them to be retransmitted to the output flow λ in the order of the queue 38.

The same steps are carried out in the intermediate nodes 12. At each input of an intermediate node, the HBH header is modified in particular to specify the number of nodes through which the message has passed, or the probability that the message will not arrive, calculated based on the number of hops or the remaining expiration time.

Upon arrival in the output gateway node 20, the frame of the message having the form 36, and including the HBH header after the IP header and before that of the transport protocol, is modified to eliminate the HBH header and placed in a temporary output queue 44 before being sent to the IP application 32. The message then has the format of a traditional IP message diagrammatically designated by reference 60 in FIG. 2. Thus, for the applications 30 and 32, the modification of the message done in the ad hoc network to allow the implementation of the method is transparent.

The method provides a reliabilization mechanism and a congestion management mechanism managing the transmission and retransmission of the messages in the network 10.

These mechanisms are implemented in each of the nodes as described below.

Reliabilization Mechanism

The reliabilization mechanism is done only hop-by-hop and not end-to-end. It uses the sliding window W to manage the dispatch of packets. The size of the window W defines the maximum number of packets (transmissions or retransmissions) awaiting acknowledgment. The window W is updated at each RTT (Round Trip Time), for example using an Additive Increase Multiple Decrease (AIMD) mechanism. W has a minimum value and a maximum value. W is reduced when a loss is detected (expiration of the RTO (Retransmission Time Out) for a packet in the nACKedQ queue). Decreasing W in case of loss makes it possible to be more reactive to detect the disappearance of a neighboring node, for example. The size of the window W influences the throughput, but is not used for that purpose here. The minimum and maximum values of W are preferably relatively close and not too large, in particular between 5 and 10 packets, for example.

The packets are sent with a sequence number SeqNb appearing in the header so that the receiving node can identify losses and reorder the packets if necessary. The receiving node uses a cumulative and selective acknowledgment mechanism that indicates to the receiver which packets have been received. The dispatch of acknowledgments is activated by the transmitting node, which positions the RQT flag at 1 in the data packets or upon detection of a loss owing to the sequence numbers.

The transmitting node needs to estimate the RTT to be able to update W and define the RTO (Retransmission Time Out). Upon receipt of the acknowledgment for the message M, the method estimates the RTT, its variants and the RTO with a moving average.

The reliabilization effort p associated with a flow is a global parameter that can be defined by the gateway node based on the characteristics of the flow (transport protocol, service class, particular application needs). It may in particular be calculated from:

Maximum number of retransmissions at each hop
Total maximum number of retransmissions on the route
(Estimated) expiration time of the packet in the transport layer.

The reliability of the method is advantageously improved by using a FEC (Forward Error Correction) code to increase the utility of each transmission. The redundancy level varies linearly relative to the size of the window W. When W decreases, the redundancy increases for greater reliabilization.

Marking of the Packets

The reliabilization effort $\rho$ is advantageously defined differently based on the characteristics of the transported flow. A real-time flow requires little or even no reliabilization, unlike a transfer of noncritical data from a time perspective.

Furthermore, this effort $\rho$ advantageously varies over time. In the case of the TCP transfer for example, p must be high to avoid retransmitting lost packets from the source, but must be low enough to avoid local retransmission of a packet that is already being retransmitted from end to end by the source.

The reliabilization effort $\rho$ is advantageously applied gradually along the route. To that end, the reliabilization effort may be increased upon each hop, as it is more serious to lose a packet that has already traveled a substantial portion of the path toward the destination than a packet that has just left.

The effort $\rho$ may be associated with the flow on the gateway node or upstream by an IPSec encryptor or a PEP TCP. It may for example be conveyed along the route in the header of the method or in an IP option.

Congestion Management Mechanism

The congestion management mechanism is done only hop-by-hop and not end-to-end.

Congestions are detected using a threshold s1 that is compared to the number of packets in the queue outputQ plus those of the queue nACKedQ. When the threshold is crossed, a signal is sent to the preceding transmitting node to reduce its throughput. On each node, the transmission throughput of each flow is monitored by a parameter $\lambda$.

$\lambda$ is initialized with an infinite value, and the method starts in a "non-congested" mode. Upon receipt of a congestion signal, $\lambda$ is then initialized at the current throughput of the flow. A "congestion avoidance" mode is then activated. In that mode, $\lambda$ evolves for example according to an AIMD (Additive Increase Multiple Decrease) mechanism; it increases by addition of a constant to each RTT and is multiplied by another constant when a congestion signal is received.

Once the "congestion avoidance" mode is active, the node can:
    stay there permanently, or
    return to congested mode based on the status of its queues.
        The throughput of the transmitting node therefore depends on the congestion status of a single subsequent receiving node.

In case of major congestion, a packet loss mechanism in the outputQ and nACKedQ queues is advantageously present. The packets having traveled the shortest path or having the lowest likelihood of reaching the destination on time may be discarded. Variables representative of the path traveled or the likelihood of reaching the destination in time are added to the HBH header present in that document or are provided by another module of the system (e.g.: number of hops for the routing module).

Figure 4:
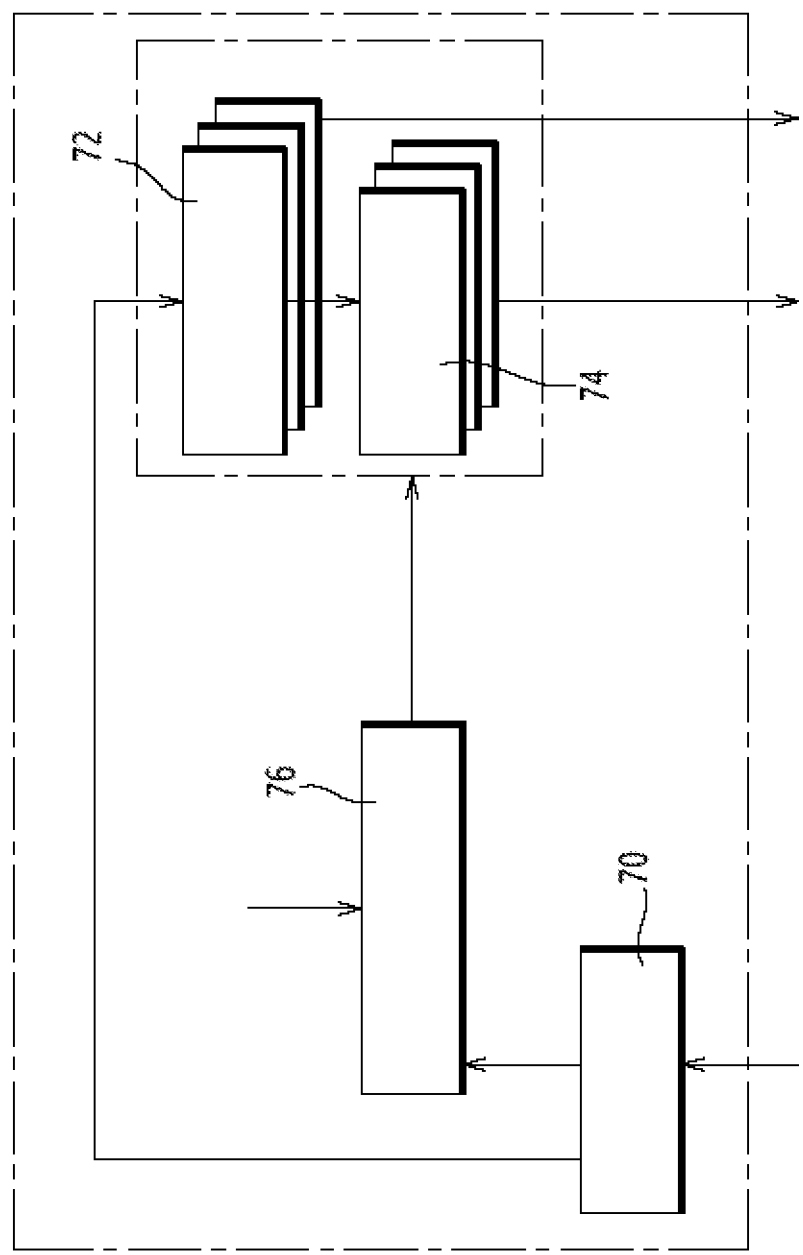
FIG. 4 is a diagrammatic view of the functional architecture of a node of the network.

For each node and as illustrated in FIG. 4, the architecture of the node includes a module for intercepting packets 70 supplying a receiving module 72 and a dispatch module 74. The different queues are managed by a flow management module 76.

The functions of the different modules are outlined hereafter.

The interception module 70 intercepts the IP packets entering the MANET network 10 and records the unknown flows with the flow management module 76. The flows are for example identified with the IP source/destination n-uplet and additional information (source/destination ports if accessible, SPI field in case of IP-Sec encryption). The packets belonging to known flows are transferred to the receiving module 72.

The flow management module 76 keeps the list of active flows. For each new flow, this module instantiates processing that will be responsible for processing it. This processing consists of flow reception 72 and dispatch 74 modules. The module may perform the following operations:

creation of flow reception 72 and dispatch 74 modules.
    update of the "flow reception" and "flow dispatch" modules (e.g., adjusting the parameters such as the threshold s1 described later).
    termination (e.g., after a period of inactivity).

The update or termination operations are advantageously activated based on statuses of the system outside the method. For example, if the system knows that new radio resources will be allocated to a recipient, the flow management module 76 increases the authorized throughput $\lambda$ (cf. description of the "flow dispatch" module and the back pressure mechanism). This would be the case for a cognitive radio network that reuses available frequencies either opportunistically or in a planned manner.

The flow reception module 72 receives the packets from the preceding transmitting node in the ooList queue denoted 34 in FIG. 2. It is responsible for acknowledging them and verifying that their sequence number is not aberrant (the difference between the sequence numbers of the packets in the queue must not be greater than a MaxReord threshold, for example).

The flow dispatch module 74 implements the hop-by-hop transfer protocol. It contains the two outputQ (packets awaiting transmission) and nACKedQ (packets awaiting acknowledgment) queues denoted 38, 40 in FIG. 2. The IP packets having reached the last node of the MANET network are then transmitted on the local network or toward the application. For the other packets in transit, the outputQ packets 38 are sent to the next node at speed λ, then are placed in the nACKedQ queue 40 while awaiting acknowledgment.

Upon receipt of the knowledgement, the packets are eliminated from the nACKedQ queue 40. The sliding window mechanism with selective acknowledgments is used to reduce the weight of the acknowledgements (see "reliability" section below). After having remained beyond the RTO (Retransmission Time Out) seconds, the packets are again placed, with a high priority, in the output queue to be retransmitted. A maximum of P retransmissions are authorized. The congestions in the outputQ queue are detected using a threshold s1. When that threshold is exceeded, a signal is sent to the preceding node so that it reduces its throughput (according to the back pressure mechanism previously described).

The ooList, outputQ and nACKedQ queues have a finite size. The new packets are lost when the queues are full. A random loss mechanism (of the RED—Random Early Detection—type) is advantageously used.

Mobility Management

When an intermediate node is no longer on the route for a given flow, the packets it has acknowledged but has not yet sent may be lost if no route exists for the destination.

The new intermediate node records the flow as a new flow.

The method according to the invention procures the following advantages:

Transport of IP packets from end to end in an effective manner

Provides an agnostic solution for the transport protocol (e.g., UDP, TCP)

Is IPSec-compatible

Optimal use of resources (local flow monitoring and suitable transport protocol for each hop)

Regulates the throughput of the end-to-end traffic by back pressure

Reliabilizes the end-to-end transmission with a configurable hop-to-hop acknowledgment mechanism Relies on typical IP routing Processes IP flows unidirectionally.

Operates in soft state. After a certain amount of time, if no packets have been processed, the memory context related to the flow is destroyed. Transports a data flow while avoiding congestion on the intermediate nodes and partially reliabilizing the transmissions on each hop. The aim of the mechanism is to avoid congestion and push losses back toward the first node in case of congestion, and to ensure configurable reliability while avoiding end-to-end retransmissions from the source.

The invention claimed is:

1. A method for transmitting information in an ad hoc multi-hop network including the transmission of a message from a source transmitting node to a final receiving node through a series of hops from a transmitting node to an immediately following receiving node, using:

a reliability management mechanism, the method including:

upon compliant receipt on each hop of at least one message by the receiving node, sending an acknowledgment message to the sole transmitting node; and applying a retransmission law of the message on the hop, from the transmitting node to the receiving node, said law including message non-retransmission rules leading to the non-retransmission of the message, and b) a mechanism for managing congestion of the nodes providing for a limitation of the throughput (λ) for sending from the transmitting node to the receiving node following congestion information from the receiving node sent to the transmitting node, wherein the method further includes applying the congestion management mechanism only on a hop-by-hop basis, the congestion information only being transmitted from the receiving node to the transmitting node over a single hop to limit only the throughput for sending from the transmitting node to the receiving node.

2. The method according to claim 1, wherein the retransmission law for a given transmitting node accounts, for the non-retransmission rules, for variables related to the nodes of the preceding hops between the source transmitting node and the transmitting node.

3. The method according to claim 2, wherein the retransmission law for a given transmitting node accounts, for the non-retransmission rules, for the number of nodes already traveled by successive hops from The source transmitting node.

4. The method according to claim 1, further comprising marking the type of information contained in the message, wherein the retransmission law accounts, for the non-retransmission rules, for the type of information contained in the message.

5. The method according to claim 1, further comprising sending an acknowledgment message only upon compliant receipt of a set of several messages.

6. The method according to claim 1, wherein the congestion management mechanism uses an Additive increase Multiple Decrease (AIMD) law to calculate the throughput (λ) of the transmitted node.

7. The method according to claim 1, wherein the congestion management mechanism uses a definitive non-transmission of certain messages from the transmitting node to the receiving node in case of congestion of the receiving node.

8. The method according to claim 7, further comprising applying the non-transmission of messages to messages having traveled through the fewest hops to the transmitting node and/or messages having the lowest probability of reaching the final receiving node.

9. The method according to claim 1, further comprising formatting the information contained in the transmitted messages for transmission on a network according to the IP Protocol, wherein the transmitted messages include, in addition to information in the IP formats, a header capable of providing the reliability management and congestion management mechanisms.

10. The method according to claim 9, wherein the header includes information representative of the transported protocol.

* * * * *